United States Patent
Clarke

(10) Patent No.: US 8,516,390 B2
(45) Date of Patent: Aug. 20, 2013

(54) SYSTEM AND METHOD OF PROVIDING VISUAL INFORMATION TO A USER

(75) Inventor: Lyle Bruce Clarke, Lunderskov (DK)

(73) Assignee: Bang & Olufsen A/S, Struer (DK)

( * ) Notice: Subject to any disclaimer, the term of this patent is extended or adjusted under 35 U.S.C. 154(b) by 128 days.

(21) Appl. No.: 12/734,690

(22) PCT Filed: Nov. 18, 2008

(86) PCT No.: PCT/EP2008/065740
§ 371 (c)(1),
(2), (4) Date: May 18, 2010

(87) PCT Pub. No.: WO2009/065822
PCT Pub. Date: May 28, 2009

(65) Prior Publication Data
US 2010/0257481 A1    Oct. 7, 2010

Related U.S. Application Data

(60) Provisional application No. 60/996,451, filed on Nov. 19, 2007.

(51) Int. Cl.
G06F 3/048      (2013.01)
(52) U.S. Cl.
USPC .......................... 715/788; 715/810; 715/764
(58) Field of Classification Search
USPC .......................... 715/810, 764, 788
See application file for complete search history.

(56) References Cited

U.S. PATENT DOCUMENTS

| | | | |
|---|---|---|---|
| 6,456,732 B1 * | 9/2002 | Kimbell et al. | 382/112 |
| 7,262,781 B2 * | 8/2007 | Balinsky et al. | 345/620 |
| 7,315,389 B2 * | 1/2008 | Kuwata et al. | 358/1.15 |

(Continued)

OTHER PUBLICATIONS

International Search Report.

(Continued)

Primary Examiner — Andrey Belousov
Assistant Examiner — Erik Stitt
(74) Attorney, Agent, or Firm — Harness, Dickey & Pierce, P.L.C.

(57) ABSTRACT

A system for providing visual information to a user, the system comprising a central unit and a portable unit adapted to communicate with each other and wherein: the central unit is adapted to: identify the information to be provided to the user, the information being an image comprising a plurality of lines of text, provide first information relating to a plurality of suitable croppings, sizes, resolutions, and/or aspect ratios of the image, provide second information as to one or more position(s) between two adjacent lines of text, forward the first and second information, as well as the image, to the portable unit, portable unit comprises: means for receiving the first and second information and the image, a display adapted to provide visual information to the user, and means for controlling the display in one of at least three modes, wherein: in a first mode, the image is converted into a first altered image by adapting the image of the visual information to a first size, cropping or resolution as derived from the first information, in a second mode, the image is converted into a second altered image by adapting the image of the visual information to a second size, cropping or resolution as derived from the first information, and in a third mode, a part of the image of the visible information is provided on the display, the part being a part of the image solely on one side of one or more of the positions of the second information.

15 Claims, 2 Drawing Sheets

(56) References Cited

U.S. PATENT DOCUMENTS

Figure 1:
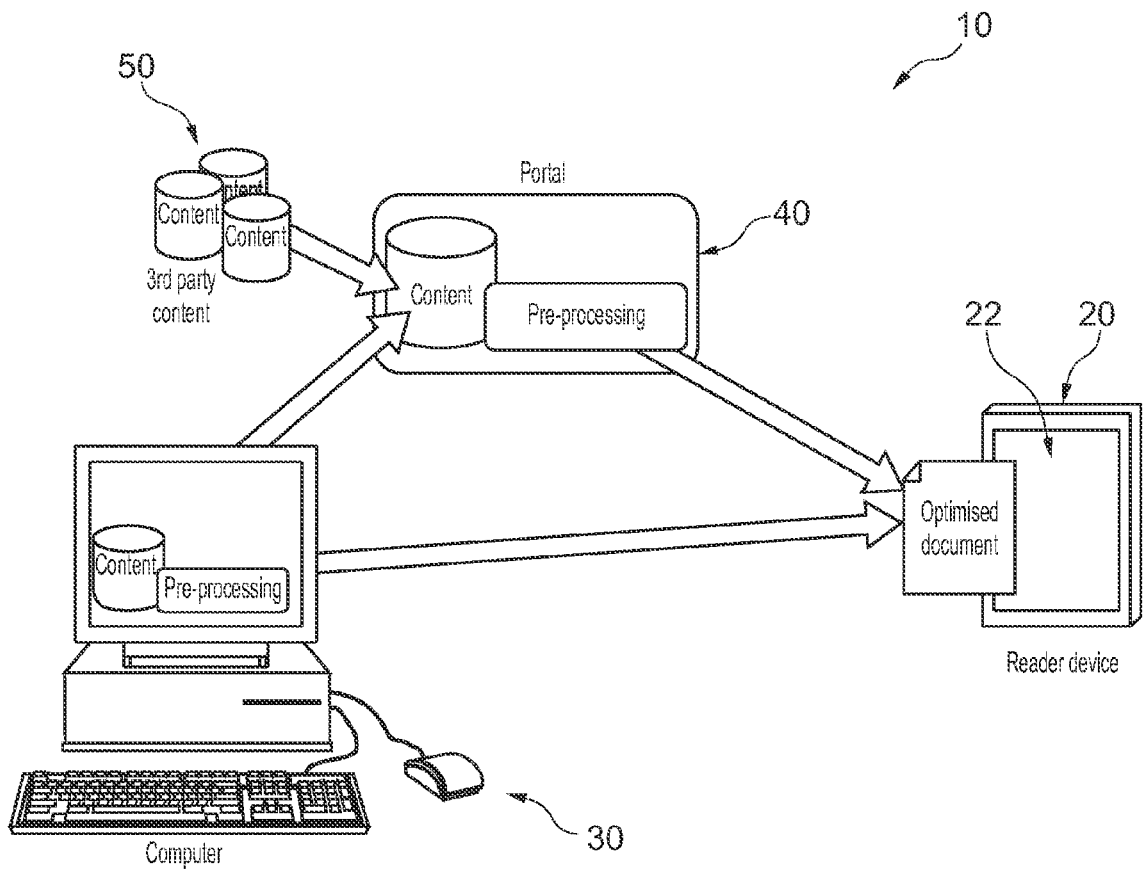

2006/0055693 A1 3/2006 Sylthe et al.
2007/0046698 A1 3/2007 Nam et al.
2009/0096749 A1* 4/2009 Kawahara et al. ............ 345/162
2009/0307583 A1* 12/2009 Tonisson ...................... 715/246

OTHER PUBLICATIONS

International Preliminary Report on Patentability and Written Opinion dated Jun. 3, 2010 issued in corresponding International Application No. PCT/EP2008/065740.

* cited by examiner

SYSTEM AND METHOD OF PROVIDING VISUAL INFORMATION TO A USER

CROSS-REFERENCE TO RELATED APPLICATIONS

This is a National Phase entry of International Application number PCT/EP2008/065740, and claims priority under 35 U.S.C. §119 to, U.S. Provisional Application No. 60/996, 451, filed on Nov. 19, 2007, the entire contents of which is hereby incorporated by reference.

The present invention relates to a manner of requiring less processing in portable units receiving images, such as pdf-files, tiff-files or the like of texts, such as books, articles, papers, newspapers, web pages, prints, or parts thereof, representing text which is to be represented in more than one manner on a display.

In a first aspect, the invention relates to a system for providing visual information to a user, the system comprising a central unit and a portable unit adapted to communicate with each other and wherein:
the central unit is adapted to:
identify the visual information to be provided to the user, the information being an image comprising a plurality of lines of text,
provide first information relating to a plurality of suitable croppings, sizes, resolutions, aspect ratios, and/or rotations of the image,
provide second information as to one or more position(s) between two adjacent lines of text, and
forward the first and second information, as well as the image, to the portable unit,
the portable unit comprises:
means for receiving the first and second information and the image,
a display adapted to provide visual information to the user, and
means for controlling the display in one of at least three modes, wherein:
in a first mode, the image is provided on the display with a first size, cropping or resolution as derived from the first information,
in a second mode, the image is provided on the display with a second size, cropping or resolution as derived from the first information, and
in a third mode, a part of the image is provided on the display, the part being a part of the image solely on one side of one or more of the positions of the second information.

In the present context, a unit is portable, if it may be carried by a person and may be operated at the same time. Thus, a weight below 5 kg, such as below 2 kg is desired, as is the presence of a battery for allowing wireless operation. In addition, the overall dimensions of the portable unit preferably is as that of laptop computers or tablets or smaller. Some embodiments, however, may have a dimension equal to that of computer monitors in that the unit may be used for presenting text to be read by the user.

Naturally, the central unit may be adapted to provide information for only a single or multiple portable units. This central unit may be a PC, a server or a multiple thereof and may e.g. be positioned in the user's home or work or may be positioned at a supplier supplying users with the information desired.

The communication between the central unit and the portable unit may be any type of communication, such as wireless communication (such as Bluetooth®, WiFi, wireless internet, RF communication, IR-based communication, or the like) or via wires (optical links, Ethernet communication, ADSL communication). The communication may be via a LAN, WAN, or other type of network. Naturally, the communication may be only local, if the central unit is positioned close to the portable unit during communication, or may be a combination of local and WAN/other communication, if the central unit is positioned farther away, so that the communication may be via wired and e.g. WAN and/or ADSL from the central unit to a communication element closer to the portable unit, and wireless (such as wireless Ethernet or Bluetooth®) from the communication element to the portable unit. Any combination of communication elements may be chosen to obtain the communication required. Also, the communicating means and capabilities of the central unit and the portable unit may be chosen from a wide variety of different means/capabilities.

It is noted that the communication between the portable unit and the central unit need not take place all the time. Once the information is received by the portable unit, this unit may be able to provide the information to the user without communicating with the central unit.

In this context, the information is in the form of an image, which contains a plurality of lines of text. This may be pdf-file, a bitmap, a tiff-file or other digital or analog representation representing a page (or multiple pages) of an article, a book, a newspaper, a screen-dump of a web page and/or a text editor with the text, or any other manner of representing a text. Naturally, one or more pictures, graphs, illustrations, photographs, or the like may also be present in the image.

The portable unit has multiple modes of operation where the image may be provided in different manners. In a preferred embodiment, one mode may be one where multiple types or pieces of visual information are illustrated to the user for the user to choose between, and another mode may be one in which fewer types or pieces of information are provided at the same time. Thus, different parameters such as sizes, croppings, rotations, and/or resolutions of the individual image may be required or desired, such as in order for the individual images to be visible and identifiable.

In order to not require the portable unit to perform such croppings/re-sizings/resolution changes and/or changes of aspect ratios or the like, according to the invention, such determination is performed by or at the central unit in order for the portable unit to simply select a suitable parameter and thereby perform less computations in order to arrive at the image desired.

Naturally, different manners exist of altering an original image in order to arrive at a desired image, depending on the desired effect of the alteration. One reason may be in order to provide a reduced size of the same image. Thus, a smaller resolution may be provided. Alternatively, a cropping may be performed in order to select a part of the original image. In one situation, cropping may be used in order to remove any margins of the page(s) in order to allow any parts of the portable unit outside an area of displaying to form suitable "margins" or other areas for handling the portable unit while being able to view the full area of the display. Also, other manners exist of altering the size of an image. Naturally, the aspect ratio of the image may be altered in order for the shape of the final image to conform to a desired shape.

In addition to the providing of the first information to facilitate easier providing of images with different parameters, one mode of the portable unit is directed primarily to the reading of text in the image. In this context, it is desired to be able to divide the image into smaller parts in order to allow letters of the text to be of a sufficient size, visibility and/or resolution to be readily read. Numerous viewers, such as pdf-viewers exist which are able to illustrate only part of a text, but these normally have the disadvantage that text lines may be cut in half (upper and lower half on different "pages") or, in order to avoid this, repeated at the bottom of one page and at the top of the next page. This has been found undesirable.

Thus, the second information relates to a position between two adjacent text lines in order for the third mode of the portable unit to be able to illustrate one or more parts of the image delimited by the determined position so that no text lines need be duplicated or divided Naturally, in the present context, the display of the portable unit may be any type of electric or electronic display, such as a CRT, an LCD display, an OLED display, or an e-ink display such as the E-Paper Panel manufactured by Prime View International.

In a preferred embodiment:
the central unit is adapted to identify a plurality of pieces of information and to forward these each with corresponding first and second information to the portable unit,
the receiving means are adapted to receive the plurality of pieces of information and corresponding first and second information, and
the controlling means of the portable unit is adapted to control the display so that:
in the first mode, first altered images of a first number of the pieces of information are provided on the display, the first number being larger than three,
in the second mode, second altered images of a second number of the pieces of information are provided on the display, the second number being smaller than the first number.

Thus, the size of the individual pieces of information may vary between the first and second mode. In one situation, the first mode may be used as an overview of different groups of pieces of information, and the second mode may be used as an overview of a fewer pieces of information within a given group of pieces of information.

In another embodiment, the portable unit comprises means for transmitting to the central unit information relating to the portable unit, and wherein means for providing the first and second information are adapted to provide first and second information corresponding to the information received. In this situation, the adaptation of the image may be adapted to parameters of the display of the portable unit. Different displays may have different dimensions, resolutions, numbers of pixels or bits per inch, colour outputs, contrast, or the like. Thus, in order to obtain the best possible viewing experience, it may be desired to optimize the image for the individual display or portable unit.

Naturally, each portable unit may have its own ID number, or the portable unit may transmit information relating to a type or group of portable units which all have the same or similar relevant parameters. Alternatively, the portable unit may simply transmit the parameters to which the information should be adapted.

In general, the central unit may then have a storage comprising information correlating the ID/type or parameter(s) to desired characteristics of the adapted image(s) so as to be able to perform the adaptation.

In yet another embodiment, the means for providing the first and second information are adapted to provide a plurality of sets of first and second information for the identified information, and wherein the portable unit comprises means for selecting a set of first and second information. As opposed to the above embodiment, the information for a plurality of types of displays (different dimensions, contrasts, colour outputs, etc) may be provided and transmitted to all or a group of (different) portable units, where each unit may then perform the adaptation or select the adaptation relating to or being suitable for the parameters of the display of the actual portable unit.

The first and second sets of information may be provided in any suitable manner, such as a matrix of two or more dimensions, the coordinates of which are used by the portable unit to determine or select the correct or suitable information.

In addition, the portable unit may comprise means for determining a behaviour of the user. In one embodiment, the selecting means selects a set of first and second information depending on the behaviour determined, where information is provided relating to different types of behaviour. In another embodiment, the behaviour is transmitted to the central unit which then adapts the adaptation on the basis also on the detected behaviour.

This behaviour may be any type of behaviour, such as that of rotating the display to obtain a different width/height relationship thereof. In this situation, a rotation of the image may be provided in order to maintain the image readable or easily identifiable for the user. Another behaviour may be the use of or quantity of illumination, which may be taken into account by adapting the contrast, colours or the like of the image(s). Yet another parameter may be the eye sight or vision of the user. A good eye sight makes possible a minimizing of images, whereas a reduced eye sight may require that the images are larger in order to remain understandable to the person. Naturally, these parameters may be controlled by related metadata in order to have the contents of the image have an influence on the presentation of that image.

In one embodiment, the central unit is adapted to provide, for an image comprising a plurality of pages, first information relating to each of a first plurality of the pages and second information for each of a second plurality of the pages, where the controlling means of the portable unit is adapted to determine which page to provide on the display and control the display accordingly. This may be, if the image is that of a multi-page book. In this situation, it may be desired that the front page and all pages with beginning chapters are to be illustrated as images in the first and/or second modes, and where all other text pages are to be illustrated merely in the third mode.

When identifying a book/article or the like, it is normally performed by recognizing the front page (even if reduced in size), whereas a page inside the book/article rarely is readily recognizable due to may such pages looking alike.

In another embodiment, the controlling means is adapted to, in the third mode, determine a text font and to provide the image with the determined text font. In this situation a part of the second information derived may be the identity of a font with which the text is provided. This font may have the distance between letters/signs/words adapted to the display/situation/user/behaviour, as may the colour and size thereof. It has long been known and studied that different fonts have different advantages and disadvantages when provided on digital monitors, such as flat panel monitors, CRT's, LCD monitors, OLED monitors and the like.

In a particularly interesting embodiment:
the central unit is additionally adapted to:
identify digital information to be provided to the portable unit,
provide third information relating to a plurality of suitable croppings, sizes, resolutions and/or aspect ratios of an image of the digital information, provide fourth information relating to a suitable text font for the digital information, and transmit the identified digital information with the third and fourth information to the portable unit, and wherein:

the receiving means are adapted to also receive the identified digital information with the third and fourth information, the controlling means are adapted to control the display in an additional fourth mode wherein a part of the digital information is provided on the display with the font of the fourth information.

In this respect, digital information is meant to be e.g. a word processor file defining the text and the looks thereof in a manner so that the looks may easily be altered. Thus, normally, margins, font, colour, cropping, size and the like may be easily altered in digital information compared to images, where, normally, the text is stored as an image.

However, as mentioned above, the font, colours, margins, etc. may be varied to obtain optimum readability on different displays.

It may, however, be desired to maintain the original settings (choice of font etc) when generating the first information in order to have the different parameters relate to facilitate easy recognition or identification thereof independently of any change in looks when actually reading the text, in the fourth mode.

Another aspect of the invention relates to a method of providing visual information to a user, the method comprising providing a central unit and a portable unit adapted to communicate with each other, the method comprising:

the central unit:

identifying the information to be provided to the user, the information being an image comprising a plurality of lines of text, providing first information relating to a plurality of suitable croppings, sizes, resolutions and/or aspect ratios of the image, providing second information as to one or more position(s) between two adjacent lines of text, forwarding the first and second information, as well as the image, to the portable unit, portable unit:

receiving the first and second information and the image, controlling a display in one of at least three modes, wherein:

in a first mode, the image is provided on the display with a first size, cropping or resolution as derived from the first information, in a second mode, the image is provided on the display with a second size, cropping or resolution as derived from the first information, and in a third mode, a part of the image is provided on the display, the part being a part of the image solely on one side of one or more of the positions of the second information.

In one embodiment:

the portable unit transmits to the central unit information relating to the portable unit, and the first and second information is provided corresponding to the information received.

As mentioned above, the information transmitted by the portable unit may relate to parameters to which the first/second information should correspond or relate, or the transmitted information may relate to an ID or type of the portable unit or the display thereof, where the central unit then is adapted to derive information relating to how to then derive the knowledge of how to process the image.

In another embodiment, the step of providing the first and second information comprises providing a plurality of sets of first and second information for the identified information, and wherein the portable unit is adapted to select a set of first and second information. As mentioned above, the central unit may derive first/second information for a number of situations or types/IDs of portable units and transmit this to all or a group of different portable units.

In one situation, the portable unit determines a behaviour of the user, and wherein the selecting step comprises selecting a set depending on the behaviour determined. In another situation, the portable unit may transmit behaviour information to the central unit for the central unit to provide first/second information for the portable unit on the basis of the behaviour determined.

In one embodiment the central unit provides, for an image comprising a plurality of pages, first information relating to each of a first plurality of the pages and second information for each of a second plurality of the pages, where the portable unit determines which page to provide on the display and controls the display accordingly. This may be in a situation where only a part of the image is desired used for identification/recognition, and other parts only for reading/illustration.

In another embodiment, the controlling step comprises, in the third mode, determining a text font and providing the image with the determined text font.

In yet another embodiment:

the central unit additionally:

identifies digital information to be provided to the portable unit, provides third information relating to a plurality of suitable croppings, sizes, resolutions, and/or aspect ratios of an image of the digital information, provides fourth information relating to a suitable text font for the digital information, and transmits the identified digital information with the third and fourth information to the portable unit, and wherein:

the portable unit also receives the identified digital information with the third and fourth information, the controlling step comprises controlling the display in an additional fourth mode wherein a part of the digital information is provided on the display with the font of the fourth information.

Figure 2:
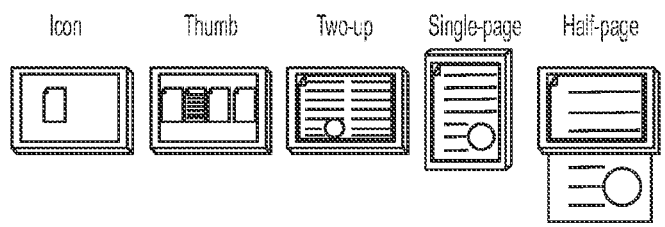
Figure 3:
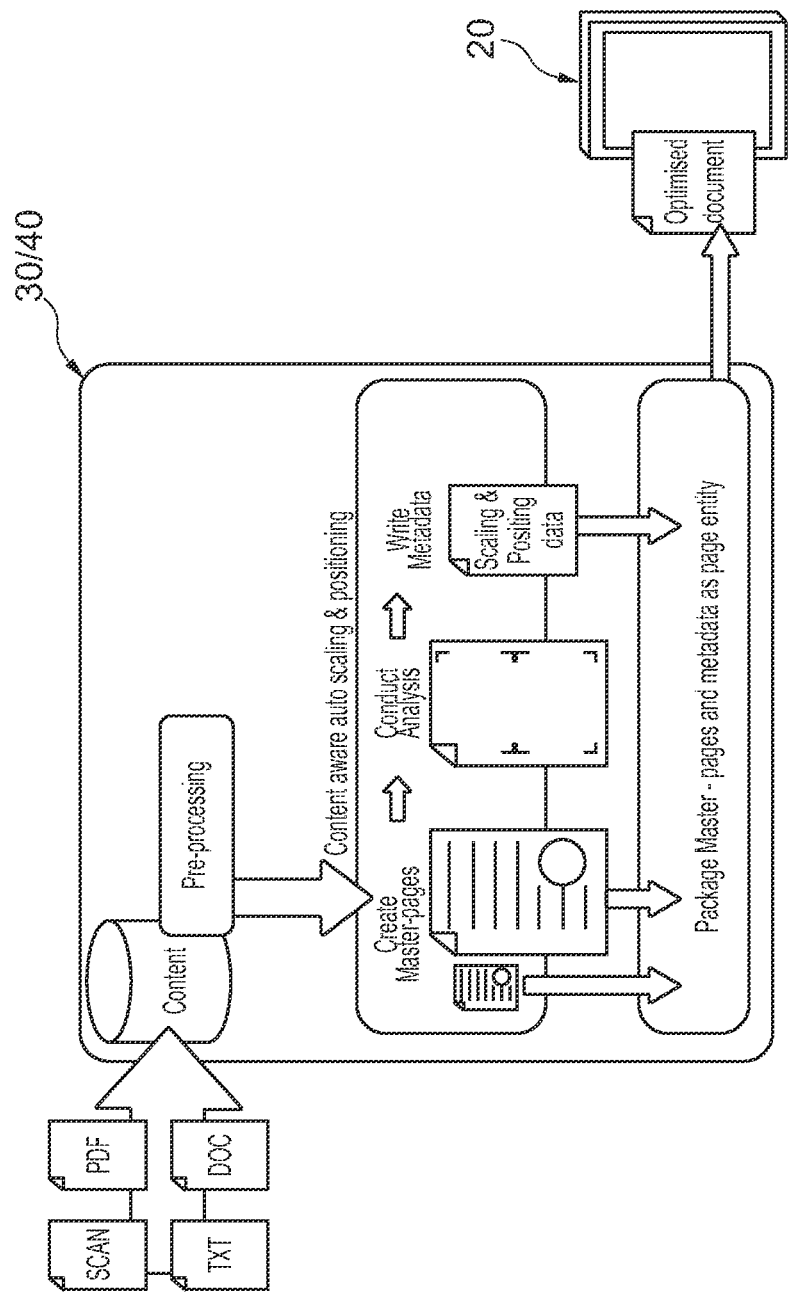

In the following, a preferred embodiment of the invention will be described with reference to the drawing, wherein:

FIG. 1 illustrates the overall elements of a system according to the invention, FIG. 2 illustrates different manners of displaying a document or a part of a document on a portable unit, and FIG. 3 illustrates processing of a page or document in more detail.

In FIG. 1, it is seen that a system 10 comprises a portable unit or reader 20 communicating with a computer 30 and/or a portal 40, which may derive contents from external sources 50. The reader 20 has a display 22 and means (not displayed) for communicating with the computer/portal in any desired manner (IR, Bluetooth, WWW, LAN, WAN, Ethernet, Wireless or via wires.). In addition, the reader 20 will normally have a battery and other desirable elements, such as speakers, a processor, buttons etc.

In general, the reader 20 receives documents from the computer/portal and presents these to a user. As will become clear further below, these documents are pre-processed by the computer/portal in order to adapt these to different modes of viewing/displaying.

In FIG. 2, different modes of displaying one or more pages of a document are illustrated: as an icon, a thumbnail image, two pages at the same time, one full page, and half a page.

Naturally, different modes of displaying may be used in different situations. The icon may be used when many references or documents are provided or offered to the user at the same time. Naturally, a page reduced in size (such as by reducing the size of the full page or by selecting a part thereof (cropping), or a combination thereof), will make it less easy to identify or recognize the page, whereby it may be desired to have more than one reduced size image. The larger "reduced size" thumbnail image may be used in situations where more space may be allocated on the display for this document.

It is seen that the computer/portal may therefore define different sizes of the document or at least a page (normally the front page thereof), in order to take into account different viewing situations on the reader 20.

This is illustrated in FIG. 3, wherein it is seen that the computer/portal receives (from any source, such as a scanner or the www) one or more documents in any format. These documents are processed so as to provide information or metadata relating to different sizes as well as in order to determine one or more positions between adjacent lines in order to provide the views desired. Then, the data (the amended document or the document with the adaptations so that the reader 20 may amend the document itself) is transmitted to the reader 20.

The view representing less than a page is provided in order to have a sufficient size of the text in order for a user to be able to easily read the text. In this view, the length (up-down in the text) of the display is taken into account in order to determine between which lines to make the break so that the part of the document (above or below the break—or between two breaks) may be represented fully on the display 22.

Naturally, the different images may be transmitted to the reader 20 or information as to how (and to what degree) to reduce the size may be provided to the reader 20 in order for the reader to itself perform this reduction.

It is also seen that the reader may rotate the page viewed (here illustrated with a full page, but this it by no means a requirement), or change the aspect ratio thereof in order to adapt to the individual situation. Thus, the computer/portal may also foresee this and provide the relevant image or information to the reader 20.

In use, the reader 20 may have an upper layer user interface, in which a number of different topics are each illustrated by an icon being a scaled-down version of a document of each topic. The reader will recognize these icons and understand the grouping of the documents.

The user may then select a grouping either by the display 22 being touch sensitive or by other selecting/pointing means as are well known in the computer/pc/tablet/laptop industry.

Having selected a group of documents or a subject, individual documents under this group may be represented individually by a thumbnail. This thumbnail may be a front page of the document or a starting page of a part of the document, if the user already has read a previous part thereof. In one situation, this starting page may be the first page of a particular chapter of a book, if the user has read the previous chapters.

The user may then select a document, whereby the document may be provided in any of the three examples illustrated to the right in FIG. 2. Thus, the user may wish to have multiple pages of the document represented, a single page, or a part thereof. Naturally, if the user already has accessed the document earlier, the reader 20 may store the manner in which the document was earlier provided and provide the document in that manner again.

Naturally, the user may again wish to leave the document and navigate to the group or the top level in order to read another document, if desired.

Of course, the reader may be used also for other purposes than reading documents, such as playing games, surfing on the WWW, watching movies/video, and for listening to music or other audio feeds.

In this respect, it is noted that, overall, two types of documents may be defined: the analogue documents which are more like an image, and digital documents, which are more like word processing files defining the individual words/letters/numbers/signs and additionally potentially defining margins, fonts, colours and the like Changing the font of a digital document is simple, whereas it may require the deriving of the text from the image of an analogue document, before the font may be altered.

In this manner, the icon and thumbnail of an analogue document may easily be derived by downscaling or otherwise providing the icon/thumbnail, whereas more choices are available with digital documents. Naturally, the pre-defined font, colours, margins etc. of the digital document may be retained, whereby the same manners of providing the icon/thumbnail as with the analogue documents exist. This has the advantage that the document will look the same (taking into account the change in size and any cropping performed), whereby the user may more easily recognize the document. Alternatively, it may be desired to alter e.g. the font in order to obtain a better readability of text at the changed size.

Naturally, both analogue and digital documents may have their fonts changed especially in the views where the user is to read the text (the three rightmost examples of FIG. 2).

Naturally, different readers 20 may have different properties, such as different sized displays 22, different aspect ratios, different resolutions or colour responses, and the like. Thus, different readers 20 may have to or may suitably represent the same document in different manners. The icons or thumbnails may have different sizes/aspect ratios, the fonts used may differ, as may colours, and different numbers of text lines (or distances from e.g. the top of the page to the page break between two lines) may be selected according to the dimensions of the display 22 and the rotation thereof.

The computer/portal may provide, for each reader 20, particular information relating to how to adapt a particular document to the actual reader 20. This may be performed by the reader 20 transmitting to the computer/portal information relating either to the type or ID of the reader 20 (whereby the portal/computer will know how to adapt the document) or the reader 20 transmitting parameters to which the adapted document should adapt. Then, the computer/portal may transmit adapted documents to the pertinent reader 20.

Alternatively, the portal/computer may provide such information for a variety of readers 20 and provide this information to all or a group of different readers 20.

Each reader may then know its own type or ID and/or otherwise be adapted to derive the information relevant to itself and thereby derive the documents adapted to this reader 20. This information may be transmitted as a matrix (of any dimension), so that also, as will become clear further below, also other parameters may be taken into account.

In one embodiment, the reader 20 is adapted to determine a behaviour of the user and also select document adaptation on the basis thereof. A simple behaviour is that of rotating the text on the display 22 in order to read it in another manner. The reader 20 may detect this (using e.g. an accelerometer) and subsequently provide the documents in the desired direction. This rotation may be provided in the information from the computer/portal or may be communicated thereto in order to obtain such information for later use.

An advantage of having the computer/portal perform the adaptation of the documents is that any improvements in optimisation techniques can be deployed on all devices without the devices themselves needing updating.

Further below, particular goals for a particular product will be given. The 'Experience Goal' here denotes the intent of the optimisation. The Experience Goal could vary depending upon a profile consisting of a combination of content type, user preferences, and the concept of the device itself. In the case of the present product, the so-called BeoReader using the so-called e-ink display, the main Experience Goal is 'pleasurable reading'.

1. The basic idea is to consider the ramifications of e-ink display technology actually being dark-grey text on a light-grey background instead of being the typical black text on a bright white background of paper or screen.
2. Based on these ramifications action needs to be taken to optimise towards the e-ink medium, regardless of the 'standards' that may exist for rendering these same documents on traditional display mediums (LCD, CRT & paper).
3. There are two main types of documents, digital documents, where the text literally still is text, and analogue documents, where the text is actually an image (for example a scan). Each have slightly different optimisation strategies
   a. Optimisation of digital documents
   The readability of digital documents rests heavily upon the fonts that are chosen and how they are rendered. Most digital documents today are either intended to be printed black text on white paper, or intended to be rendered on a low-resolution electronic screens with a matrix of pixels.
      i. The problem: Digital documents intended for paper have a tendency to look 'washed out' on e-ink and digital documents intended for screen reading are harder to read on e-ink than typographically set documents.
      ii. In reading oriented modes:
         1. the existing fonts need to be replaced with fonts that render well in e-ink.
         2. screen documents need to be automatically typographically set for the more paper-like typography that e-ink allows.
      iii. In file management and browsing modes:
         1. the existing fonts, the existing typography, and the existing layouts should all be retained, so as to ensure the miniature versions of the documents are correspond to, and are recognisable as, the paper equivalents.
   b. Optimisation of analogue documents
   Analogue documents are typically direct copies of a paper example that has been scanned, but some documents fall into this category that have been rendered as images from the digital documents they originated from.
      i. The problem: Like their digital documents counterparts, analogue documents have a tendency to look 'washed out' on e-ink. With analogue documents however the fonts cannot be changed.
      ii. In all modes (reading, file-management and browsing):
         1. the analogue picture needs to be adjusted, e.g. brightness, contrast and levels, towards the density and stroke-width for an optimal reading experience.
         2. Scanned documents that are misaligned vertically or horizontally should be realigned.
1. The basic idea is to create a limited number of master pages (that have been tuned for optimal experience on the device) together with metadata information describing where each page should be scaled and cropped to provide the optimal experience in each mode or view.
2. Correspondingly, the device has the ability to render the master pages in the manner described by the metadata information.
3. The framework is an answer to the opportunities and problems that exist because of fundamental differences between content and reading on an electronic device in comparison to paper content and reading.
   a. Documents intended for paper have features of their physical layouts that are not needed on an electronic reader, in particular:
      i. Large margins—On an electronic reader the device itself, visually and partially functionally, fills the role of the margin. Documents with 'paper margins' end up appearing small in the middle of the reader display. Manually removing margins using a personal computer is a complex and time consuming task, but the improved experience is substantial.
      ii. Aspect ratios—Documents originating on paper, or intended for paper, will often have a aspect ratios different than the aspect ratio of the display on the device. Blatant rescaling of the aspect ratio as is standard in video reduces experience of a document. Manually 'reshaping' the document through cropping and/or adding is an even more complex and time consuming task, but once again, the improved experience at time of reading is substantial.
      iii. The fold—Displaying the document half a page at a time, in conjunction with rotating the device 90 degrees (i.e. from portrait to landscape) is an intuitive way of increasing the size of text. However, when cutting the document exactly in the middle there is a sizeable chance that the 'fold' cuts through text, which greatly disturbs the flow of deep reading, as every 'page turn' results in sizeable break where the brain has to figure out what happened. This is in contrast to the simplicity of a physical book where the start of a new page continues seamlessly from the end of the previous.
   b. Additionally, electronic documents have the ability to be displayed at a variety of sizes, from e.g. icons, thumbnails, double page spread, single page, and half-page. For each different sizes, the optimal solution for each of the aspects above varies.
4. The 'Content Aware Auto Scaling & Positioning Framework' has the purpose of addressing all of the above aspects.
   a. Each page in the document in optimised for e-ink rather than the originally intended display technology, as described in the previous section,
   b. A limited number of master pages are created for each page
      i. For example two sizes, one for the large page views, such as full page and half-page, and one for the smaller-page views, such as double-up, thumbnail and icon ii. It is also possible that one master page would be sufficient for all page view sizes, but this would depend upon the actual device and the actual content.
c. An analysis is made of how best to scale and position each page at each page-view size. The analysis is made based on a set of rules that take into consideration:
  i. The physical layout of content on the page
  ii. The graphical user interface of the device
  iii. The nature of the content,
    1. office document, journal, news article, book
    2. Analogue or digital
  iv. Customer preferences
    1. preferred reading size
    2. country & language (e.g. right to left vs left to right)
  v. Time of the day
  vi. Perception studies
  vii. Knowledge in the typographic domain.
d. The parameters to scales and position each page is recorded as metadata.
e. The metadata file for each page, together with the master pages for each page, make up the 'page entity' that the device receives as the page.
f. A document is a collection of 'page entities', packaged as a single file.
g. The document is transferred to the reader.
h. When the document package is accessed, depending upon the currently chosen page and page view size, the device scales and positions the master page defined in the metadata file according to the specifications for scaling and positioning that are also defined in the metadata file.

One manner of altering a document is to use the methods long known to typographers:

The most important factor may be the typeface selection, which has the most impact on readability and legibility. One should pick a well crafted font. Good kerning (adjusted space of character pairs) is essential.

On average, font sizes of 9 point are very readable, though depending on many more interconnected parameters. It is a good starting point to pick a typeface and define the more global parameters as tracking and leading of a block of text accordingly.

In general, it may be taken that 54-80 characters and spaces per line of text are ideal. there is a difference between typesetting for short periods of reading in topic based texts and reading a scientific text with several long words, which can have a slightly higher character count per line. One reason is avoiding word breaks.

Naturally, typographical preferences are based on familiarity and can hardly be generalized. Thus, it may be desirable to have one or more exceptions and personalization possibilities.

The invention claimed is:

1. A system for providing visual information to a user, the system comprising:
    a central unit; and
    a portable unit having a display configured to provide the visual information to the user, the display having a length, the central unit and the portable unit being configured to communicate with each other, wherein
    the central unit is configured to
        identify the visual information to be provided to the user, the visual information being an image including a plurality of lines of text,
        provide first information relating to a plurality of suitable croppings, sizes, resolutions, and/or aspect ratios of the image,
        provide second information as to one or more positions between two adjacent lines of text taking into account the length of the display, the two adjacent lines being from the plurality of lines of text, and
        forward the first and second information, as well as the image, to the portable unit,
    the portable unit includes
        an adapter configured to receive the first and second information and the image, and
        a processor configured to control the display in each of at least three modes, wherein
            in a first mode, the image is converted into a first altered image by adapting the image of the visual information to a first size, cropping or resolution as derived from the first information,
            in a second mode, the image is converted into a second altered image by adapting the image of the visual information to a second size, cropping or resolution as derived from the first information, and
            in a third mode, only a part of the image of the visual information is provided on the display, the part being a part of the image above or below a position of the second information or between two positions of the second information so that the part is fully represented on the display.

2. The system according to claim 1, wherein
the central unit is configured to identify a plurality of pieces of information and to forward these each with corresponding first and second information to the portable unit,
the adapter is configured to receive the plurality of pieces of information and corresponding first and second information, and
the processor is configured to control the display so that
    in the first mode, first altered images of a first number of the pieces of information are provided on the display, the first number being larger than three, and
    in the second mode, second altered images of a second number of the pieces of information are provided on the display, the second number being smaller than the first number.

3. The system according to claim 1, wherein the adapter is configured to transmit, to the central unit, information relating to the portable unit, and wherein the central unit is configured to provide first and second information corresponding to the information received.

4. The system according to claim 1, wherein the central unit is configured to provide a plurality of sets of first and second information for the identified information, and wherein the portable unit includes an interface configured to enable selecting a set of first and second information.

5. The system according to claim 4, wherein the portable unit includes a sensor configured to determine a behavior of the user, and wherein the interface is configured to select a set depending on the behavior determined.

6. The system according to claim 1, wherein the central unit is configured to provide, for an image including a plurality of pages, first information relating to each of a first plurality of the pages and second information for each of a second plurality of the pages, where the processor is configured to determine which page to provide on the display and control the display accordingly.

7. The system according to claim 1, wherein the processor is configured to, in the third mode, determine a text font and to provide the image with the determined text font.

8. The system according to claim 1, wherein
the central unit is additionally configured to
identify digital information to be provided to the portable unit,
provide third information relating to a plurality of suitable croppings, sizes, resolutions, and/or aspect ratios of an image of the digital information,
provide fourth information relating to a suitable text font for the digital information, and
transmit the identified digital information with the third and fourth information to the portable unit,
and wherein
the adapter is configured to also receive the identified digital information with the third and fourth information, and
the processor is configured to control the display in an additional fourth mode wherein a part of the digital information is provided on the display with the font of the fourth information.

9. A method of providing visual information to a user, the method comprising:
providing a central unit and a portable unit, the portable unit having a display configured to provide the visual information to the user, the display having a length, the central unit and the portable unit configured to communicate with each other,
the central unit:
identifying the visual information to be provided to the user, the visual information being an image including a plurality of lines of text,
providing first information relating to a plurality of suitable croppings, sizes, resolutions, and/or aspect ratios of the image,
providing second information as to one or more positions between two adjacent lines of text taking into account the length of the display, the two adjacent lines being from the plurality of lines of text, and
forwarding the first and second information, as well as the image, to the portable unit,
the portable unit:
receiving the first and second information and the image,
controlling the display in each of at least three modes, wherein
in a first mode, the image is provided on the display with a first size, cropping or resolution as derived from the first information,
in a second mode, the image is provided on the display with a second size, cropping or resolution as derived from the first information, and
in a third mode, only a part of the image is provided on the display, the part being a part of the image above or below a position of the second information or between two positions of the second information so that the part is fully represented on the display.

10. The method according to claim 9, further comprising:
the portable unit transmitting to the central unit information relating to the portable unit, and
the first and second information are provided corresponding to the information received.

11. The method according to claim 9, wherein the step of providing the first and second information comprises providing a plurality of sets of first and second information for the identified information, and wherein the portable unit is configured to select a set of first and second information.

12. The method according to claim 11, wherein the portable unit determines a behavior of the user, and wherein the selecting step comprises selecting a set depending on the behavior determined.

13. The method according to claim 9, wherein the central unit provides, for an image comprising a plurality of pages, first information relating to each of a first plurality of the pages and second information for each of a second plurality of the pages, where the portable unit determines which page to provide on the display and controls the display accordingly.

14. The method according to claim 9, wherein the controlling step includes, in the third mode, determining a text font and providing the image with the determined text font.

15. The method according to claim 9, wherein:
the central unit additionally
identifies digital information to be provided to the portable unit,
provides third information relating to a plurality of suitable croppings, sizes, resolutions, and/or aspect ratios of an image of the digital information,
provides fourth information relating to a suitable text font for the digital information, and
transmits the identified digital information with the third and fourth information to the portable unit,
and wherein
the portable unit also receives the identified digital information with the third and fourth information, and
the controlling step includes controlling the display in an additional fourth mode wherein a part of the digital information is provided on the display with the font of the fourth information.

* * * * *